(12) United States Patent
Ban (10) Patent No.: US 8,176,537 B2
(45) Date of Patent: May 8, 2012

(54) IMAGE FORMATION APPARATUS, FUNCTION EXTENSION METHOD, AND A COMPUTER READABLE STORAGE MEDIUM HAVING FUNCTION EXTENSION PROGRAM STORED THEREIN

(75) Inventor: Shinichi Ban, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 947 days.

(21) Appl. No.: 12/185,582

(22) Filed: Aug. 4, 2008

(65) Prior Publication Data
US 2009/0049541 A1 Feb. 19, 2009

(30) Foreign Application Priority Data

Aug. 13, 2007 (JP) ................. 2007-210955

(51) Int. Cl.
*G06F 15/16* (2006.01)
(52) U.S. Cl. ....... 726/7; 726/5; 726/6; 726/10; 713/168; 713/169
(58) Field of Classification Search .......... 726/5, 6, 726/7, 10; 713/168, 169
See application file for complete search history.

(56) References Cited

U.S. PATENT DOCUMENTS

| 4,821,107 A | 4/1989 | Naito et al. | |
| 2003/0088570 A1* | 5/2003 | Hilbert et al. | 707/100 |
| 2005/0185217 A1 | 8/2005 | Nishizawa et al. | |

FOREIGN PATENT DOCUMENTS

| JP | 62-221256 | 9/1987 |
| JP | 63-184448 | 7/1988 |
| JP | 01-105964 | 4/1989 |
| JP | 2000-075233 | 3/2000 |
| JP | 2005-244488 A | 9/2005 |
| JP | 2006-076034 | 3/2006 |
| JP | 2007-060163 | 3/2007 |

OTHER PUBLICATIONS

Decision to Grant Patent in JP 2007-210955 dated Jul. 28, 2009, and an English Translation thereof.

* cited by examiner

*Primary Examiner* — Eleni Shiferaw
*Assistant Examiner* — Paul Callahan
(74) *Attorney, Agent, or Firm* — Buchanan Ingersoll & Rooney PC (57) ABSTRACT

An image formation apparatus: previously stores first information allowing functions that a plurality of users are authorized to use, respectively, to be determined; receives second information input to determine a user, the second information allowing that user to be determined; determines from the previously stored first information a normal function that the determined user is authorized to use; is set to make the determined normal function available; receives third information input from a first storage medium having the third information stored therein, to determine an extended function, the third information allowing the extended function to be determined; and is set to make the determined extended function available in addition to the normal function set available.

9 Claims, 8 Drawing Sheets

DB FOR AUTHORITY FOR USE (1ST DB)

| CARD ID | USER ID | COPY FUNCTION | PRINTER FUNCTION | SCANNER FUNCTION | FACSIMILE FUNCTION | VALUE SET FOR FACSIMILE FUNCTION (FACSIMILE DESTINATION ID) |
|---|---|---|---|---|---|---|
| C0001 | U0001 | AUTHORIZED | AUTHORIZED | AUTHORIZED | AUTHORIZED | F0001,F0003,F0005 |
| C0002 | U0002 | AUTHORIZED | AUTHORIZED | UNAUTHORIZED | AUTHORIZED | F0003,F0005 |
| C0003 | U0003 | AUTHORIZED | AUTHORIZED | UNAUTHORIZED | UNAUTHORIZED | — |
| C0004 | U0004 | AUTHORIZED | UNAUTHORIZED | UNAUTHORIZED | UNAUTHORIZED | — |
| ... | ... | ... | ... | ... | ... | ... |

FIG.5

DB FOR EXTENDED FUNCTION (2ND DB)

| CARD ID | USER ID | COPY FUNCTION | PRINTER FUNCTION | SCANNER FUNCTION | FACSIMILE FUNCTION | VALUE SET FOR FACSIMILE FUNCTION (FACSIMILE DESTINATION ID) |
|---------|---------|---------------|------------------|------------------|--------------------|----|
| C9001 | — | — | — | — | AVAILABLE | F0001 |
| C9002 | — | — | — | — | AVAILABLE | F0003,F0005 |
| C9003 | — | — | — | AVAILABLE | — | — |
| C9004 | — | — | AVAILABLE | — | — | — |
| ... | ... | ... | ... | ... | ... | ... |

IMAGE FORMATION APPARATUS, FUNCTION EXTENSION METHOD, AND A COMPUTER READABLE STORAGE MEDIUM HAVING FUNCTION EXTENSION PROGRAM STORED THEREIN

This application is based on Japanese Patent Application No. 2007-210955 filed with the Japan Patent Office on Aug. 13, 2007, the entire content of which is hereby incorporated by reference.

BACKGROUND OF THE INVENTION

1. Field of the Invention

The present invention relates generally to image formation apparatuses, function extension methods and computer readable storage media having a function extension program stored therein, and particularly to image formation apparatuses, function extension methods, and computer readable storage media having a function extension program stored therein, that are suitable for extending a function that a user is permitted to use in the image formation apparatus.

2. Description of the Related Art

Conventionally there exists a multifunction peripheral that reads from a server function restriction information previously set for a user who is authenticated as based on a user ID read from a memory card and stores the information in a working area, and limits in accordance with the information a function available to that user (see Japanese Laid-Open Patent Publication No. 2005-244488, paragraph 0051, for example.).

Such multifunction peripheral facilitates setting a restriction on a function available to each user for a plurality of functions that the multifunction peripheral has. This can prevent the functions of the multifunction peripheral from being used by any user indefinitely.

To prevent improper information leakage for security such a multifunction peripheral as described in Japanese Laid-Open Patent Publication No. 2005-244488 can be used to restrict each employee in transmitting a facsimile to a client other than a client(s) who is/are associated with that employee.

Furthermore, it often happens that an employee A who is away from the office makes a phone call to an employee B who is in the office to ask employee B to transmit a facsimile to a particular client C. In that case if employee A is not restricted in transmitting a facsimile to client C and employee B is so restricted then employee B cannot transmit the facsimile to client C. However, if this is avoided by allowing all employees to transmit facsimiles to all clients without any restriction, such may lead to improper information leakage.

Thus for the multifunction peripheral of Japanese Laid-Open Patent Publication No. 2005-244488 when an employee who is not restricted in using a particular function (e.g., a function transmitting a facsimile to a particular client) is absent, and there arises a necessity of using that particular function (e.g., transmitting a document via facsimile to that particular client for an emergency) and there is no other employee who is not restricted in using the function, an administrator of the multifunction peripheral must change a setting of the multifunction peripheral temporarily to allow the function to be used before the function is used. Restricting a user other than a particular user in using a particular function thus disadvantageously prevents using the function to allow an operation to proceed smoothly.

SUMMARY OF THE INVENTION

The present invention has been made to overcome the above disadvantage, and one object of the present invention is to provide an image formation apparatus, function extension method and computer readable storage medium having a function extension program stored therein, that can restrict a user other than a particular user in using a particular function, while allowing a user who is restricted in using that particular function to use the function to allow an operation to proceed smoothly.

To achieve the above object the present invention in one aspect provides an image formation apparatus having at least one of a copy function, a printer function, a scanner function and a facsimile function, and including a first function storage unit, a user determination unit, a first function determination unit, a first availability setting unit, a second function determination unit, and a second availability setting unit.

The first function storage unit has first information previously stored therein, the first information allowing functions that a plurality of users are authorized to use, respectively, to be determined. The user determination unit receives second information input to determine a user, the second information allowing that user to be determined. The first function determination unit determines from the first information stored in the first function storage unit a normal function that the user determined by the user determination unit is authorized to use. The first availability setting unit sets the image formation apparatus to make available the normal function determined by the first function determination unit. The second function determination unit receives third information input from a first storage medium having the third information stored therein, to determine an extended function, the third information allowing the extended function to be determined. The second availability setting unit sets the image formation apparatus to make the extended function determined by the second function determination unit available in addition to the normal function set available by the first availability setting unit.

In accordance with the present invention the image formation apparatus: previously stores first information allowing functions that a plurality of users are authorized to use, respectively, to be determined, receives second information input to determine a user, the second information allowing that user to be determined, determines from the previously stored first information a normal function that the determined user is authorized to use, is set to make the determined normal function available, receives third information input from a first storage medium having the third information stored therein, to determine an extended function, the third information allowing the extended function to be determined; and is set to make the determined extended function available in addition to the normal function set available.

Thus, the image formation apparatus can make available to a user who does not use the first storage medium only a normal function that the user is authorized to use, and the image formation apparatus can make available to a user who uses the first storage medium an extended function that is determined by the first storage medium in addition to a normal function that the user is authorized to use. Thus while the image formation apparatus can restrict a user other than a particular user in using a particular function, the image formation apparatus allows a user who are restricted in using that function to use the function to allow an operation to proceed smoothly.

Preferably the third information is storage medium identification information for identifying the first storage medium having the third information stored therein. The image formation apparatus further includes a second function storage unit having the storage medium identification information and the extended function previously stored therein in association with each other. The second function determination unit receives as the third information the storage medium identification information input from the first storage medium and reads the extended function stored in the second function storage unit in association with the received storage medium identification information, to determine the extended function.

In accordance with the present invention the image formation apparatus previously stores storage medium identification information and an extended function in association with each other and receives as the third information the storage medium identification information input from the first storage medium and reads the extended function previously stored in association with the received storage medium identification information, to determine the extended function.

Thus, simply having the first storage medium store the storage medium identification information therein allows the image formation apparatus to determine an extended function from the storage medium identification information and hence readily.

Preferably the image formation apparatus further includes a function extension history storage unit storing the second information allowing the user determined by the user determination unit to be determined, and the extended function determined by the second function determination unit, therein in association with each other.

In accordance with the present invention the image formation apparatus stores second information allowing a determined user to be determined and a determined extended function in association with each other.

This allows a user for whom a function was extended to be determined after the function has been extended. This in turn allows an investigation to be conducted for an improper function extension done by a user who is not permitted to use the first storage medium.

Preferably the image formation apparatus further includes an input unit and an unavailability setting unit. The input unit receives an input corresponding to an operation ending using the image formation apparatus. The unavailability setting unit sets the image formation apparatus, if the input unit receives the input corresponding to the operation ending using the image formation apparatus, to make unavailable the normal function and the extended function set available by the first availability setting unit and the second availability setting unit, respectively.

In accordance with the present invention the image formation apparatus receives an input corresponding to an operation ending using the image formation apparatus, and if the input corresponding to the operation ending using the image formation apparatus is received, the image formation apparatus is set to make unavailable the normal function and the extended function set available.

Once a user has performed an operation to end using the image formation apparatus the image formation apparatus can set unavailable a normal function and an extended function that have been set available to that user. This can restrict a user other than a particular user in using a particular function.

Preferably the image formation apparatus further includes a value setting unit setting a value set for the normal function and the extended function set available by the first availability setting unit and the second availability setting unit, respectively.

In accordance with the present invention the image formation apparatus sets a value set for a normal function and an extended function set available.

The image formation apparatus can thus prevent a user from using an extended function beyond the range of a value that is set. This can restrict using the extended function more than necessary.

Preferably the user determination unit receives the second information input from a second storage medium having the second information stored therein.

In accordance with the present invention the image formation apparatus receives the second information input from a second storage medium having the second information stored therein.

The user can thus be readily determined.

Preferably the second availability setting unit sets the image formation apparatus to make the determined extended function available if the user determination unit determines the user.

In accordance with the present invention the image formation apparatus is set to make a determined extended function available if the user is determined.

Thus when a user is re-determined an extended function is made available. This can prevent the function from being used if the user cannot be re-determined. This can reinforce a restriction on using the extended function.

The present invention in another aspect provides a method of extending a function available in an image formation apparatus having at least one of a copy function, a printer function, a scanner function and a facsimile function and having a storage unit having first information previously stored therein, the first information allowing functions that a plurality of users are authorized to use, respectively, to be determined.

The method includes the steps of: receiving second information input to determine a user, the second information allowing that user to be determined; determining from the first information stored in the storage unit a normal function that the user determined is authorized to use, setting the image formation apparatus to make available the normal function determined; receiving third information input from a storage medium having the third information stored therein, to determine an extended function, the third information allowing the extended function to be determined, and setting the image formation apparatus to make the extended function determined available in addition to the normal function set available.

Thus the method can restrict a user other than a particular user in using a particular function, while the method allows a user who is restricted in using that function to use the function to allow an operation to proceed smoothly.

The present invention in still another aspect provides a computer readable storage medium having stored therein a function extension program executed in an image formation apparatus having at least one of a copy function, a printer function, a scanner function and a facsimile function and having a storage unit having first information previously stored therein, the first information allowing functions that a plurality of users are authorized to use, respectively, to be determined.

The function extension program causes the image formation apparatus to perform the steps of: receiving second information input to determine a user, the second information allowing that user to be determined, determining from the first information stored in the storage unit a normal function that the user determined is authorized to use; setting the image formation apparatus to make available the normal function determined, receiving third information input from a storage medium having the third information stored therein, to determine an extended function, the third information allowing the extended function to be determined; and setting the image formation apparatus to make the extended function determined available in addition to the normal function set available.

The present invention can thus provide a computer readable storage medium having stored therein a function extension program that can restrict a user other than a particular user in using a particular function, while the program allows a user who is restricted in using that function to use the function to allow an operation to proceed smoothly.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter the present invention in embodiments will be described with reference to the drawings. In the figures, identical or like components are identically denoted and will not be described repeatedly.

Note that while the present invention is applicable to a multifunction peripheral (MFP) having a copy function, a printer function, a scanner function and a facsimile function, a copy apparatus, a printer apparatus, a scanner apparatus, a facsimile apparatus, and other similar image formation apparatuses, the present embodiment will be described for the present invention applied to the MFP.

First Embodiment

Figure 1:
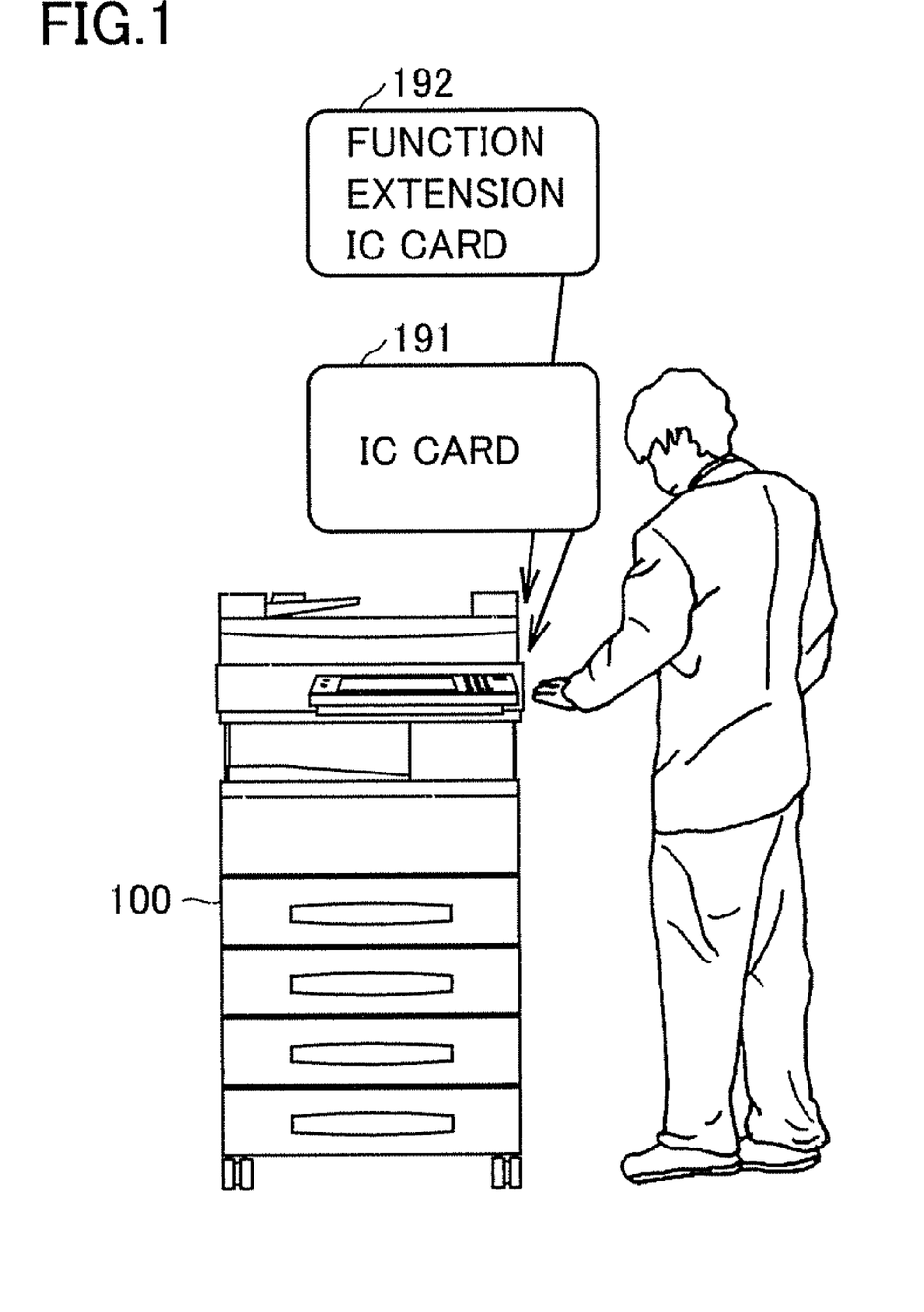
FIG. 1 shows an appearance of an MFP in an embodiment of the present invention.

FIG. 1 shows an appearance of an MFP 100 in the present embodiment. With reference to FIG. 1 MFP 100 has a copy function, a printer function, a scanner function and a facsimile function.

In the present embodiment MFP 100 reads predetermined data from an IC card 191 and a function extension IC card to authenticate a user and extend a function available to the user, respectively.

Herein IC card 191 and function extension IC card 192 are each a non-contact IC card for the sake of illustration. However, IC card 191 and function extension IC card 192 are not limited thereto; they may be a contact IC card, a magnetic card, a USB memory card or any other storage medium capable of storing data.

Figure 2:
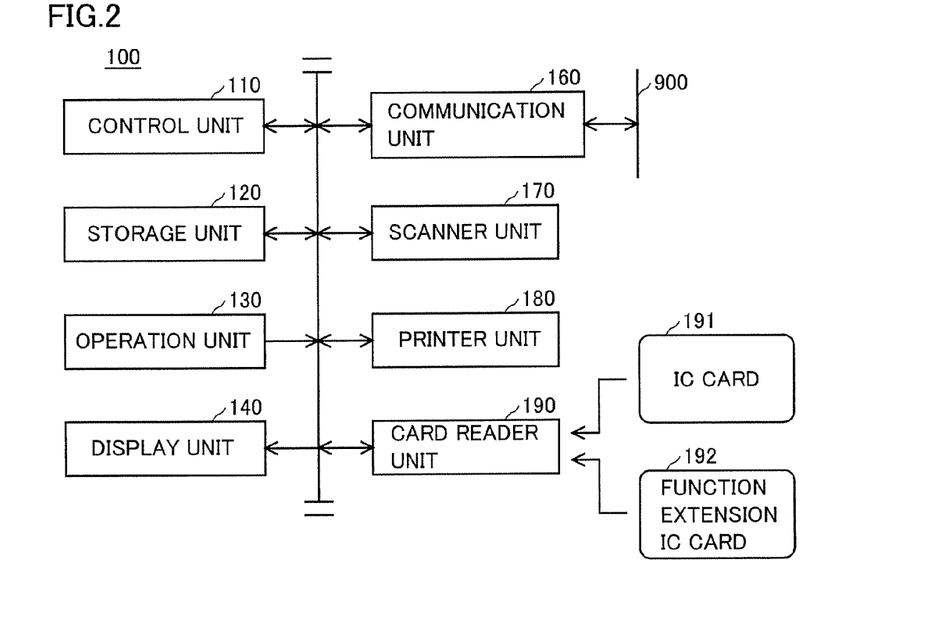
FIG. 2 is a block diagram of a configuration of the MFP in the embodiment.

FIG. 2 is a block diagram of a configuration of MFP 100 in the present embodiment. With reference to FIG. 2, MFP 100 includes a control unit 110 for generally controlling MFP 100, a storage unit 120 for storing predetermined information, an operation unit 130 for operating MFP 100, a display unit 140 for displaying predetermined information of MFP 100, a communication unit 160 for communicating with an external apparatus on a communication line 900, a scanner unit 170 for reading a predetermined image, a printer unit 180 for printing the predetermined image, and a card reader unit 190 for reading predetermined information from IC card 191 and function extension IC card 192.

Storage unit 120 includes a random access memory (RAM) used as a working memory required to execute a program in control unit 110, and a read only memory (ROM) for storing the program executed by control unit 110. Furthermore the RAM receives and stores therein a program and data read via operation unit 130, communication unit 160, scanner unit 170 or card reader unit 190 for performing a predetermined process. Furthermore, a hard disk drive or a memory card may be used as an auxiliary memory device for assisting the memory area of the RAM.

Operation unit 130 includes a plurality of operation buttons for effecting a predetermined function at MFP 100, and a touch panel configured in a display of display unit 140. A button of operation unit 130 and the touch panel of operation unit 130 are operated to input to MFP 100 what operation should be done, which is represented by an operation signal and passed to control unit 110.

Display unit 140 includes a liquid crystal display (LCD) having the display with the touch panel configured therein. The LCD of display unit 140 displays an image received from control unit 110 and indicating a state of MFP 100 and an operation button of the touch panel Note that while display unit 140 includes the LCD, it may alternatively include an electro-luminescence (EL) display, a plasma display, a surface-conduction electron-emitter display (SED) and/or an other flat panel display (FPD).

Communication unit 160 communicates data with an external apparatus, e.g., a PC, on communication line 900 under a predetermined protocol. Communication unit 160 externally transmits data received from control unit 110 and passes externally received data to control unit 110.

Scanner unit 170 optically reads visible information provided on a surface of a sheet of paper or other items, converts a read image to image data, and passes the image data to control unit 110.

Printer unit 180 receives image data from control unit 110, converts the data to an image, and prints the image on a printing sheet. The printing sheet includes: a sheet of plain paper, a sheet for photograph; overhead projector (OHP) film; and the like.

Card reader unit 190 reads data from non contact IC card 191 and function extension IC card 192 placed over card reader unit 190 and passes the read data to control unit 110. While in the present embodiment card reader unit 190 reads data from non contact IC card 191 and function extension IC card 192, card reader unit 190 may alternatively read data from a contact IC card, a magnetic card, a USB memory card, or the like.

Control unit 110 is configured of a micro processing unit (MPU) and its auxiliary circuitry. Control unit 110 controls storage unit 120, operation unit 130, display unit 140, communication unit 160, scanner unit 170, printer unit 180 and card reader unit 190 to perform a predetermined process in accordance with a program and data stored in storage unit 120 to process data received from operation unit 130, communication unit 160, scanner unit 170 or card reader unit 190, and cause storage unit 120, display unit 140, communication unit 160 and printer unit 180 to respectively store, display, output and print the processed data.

MFP 100 has a copy function, a printer function, a scanner function, and a facsimile function, as has been described above, which are implemented by each component of MFP 100, i.e., control unit 110, storage unit 120, operation unit 130, display unit 140, communication unit 160, scanner unit 170, printer unit 180 and card reader unit 190 cooperating together.

Figure 3:
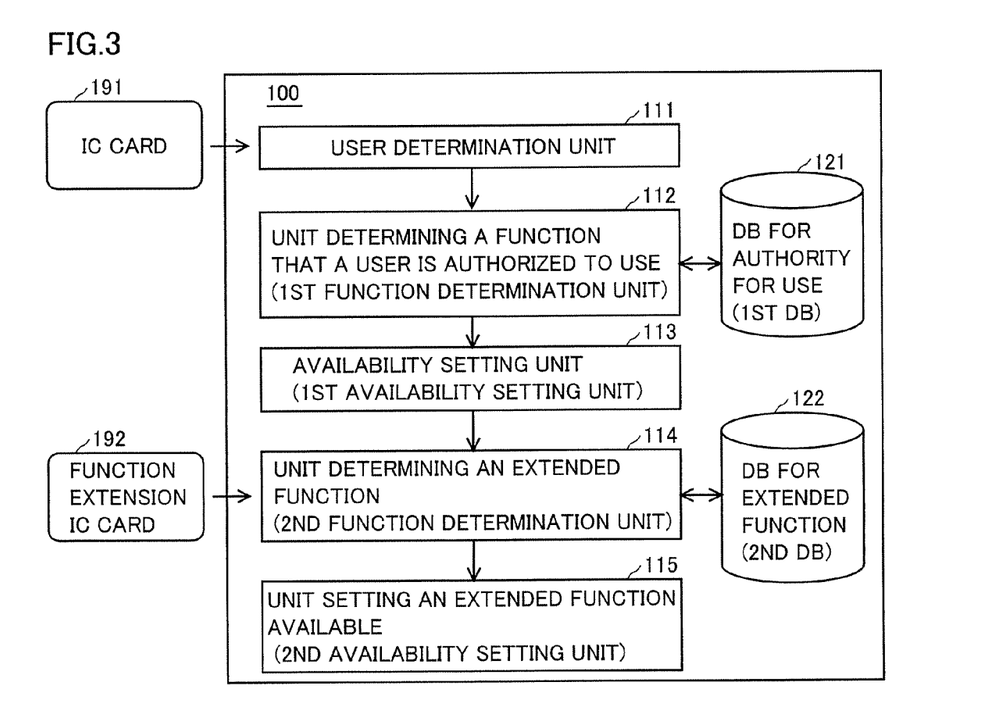
FIG. 3 is a block diagram generally showing a function of the MFP in the embodiment.

FIG. 3 is a block diagram generally showing a function of the MFP in the present embodiment. Note that in the present embodiment MFP 100 has a function, as shown in FIG. 3, configured in MFP 100 by control unit 110 executing a program of software described later with reference to FIGS. 6 and 7. Alternatively MFP 100 may have a function partially or entirely configured of dedicated hardware.

With reference to FIG. 3 MFP 100 includes a user determination unit 111, a unit 112 determining a function that a user is authorized to use (hereinafter also referred to as first function determination unit 112), a database 121 for authority for use (hereinafter also referred to as first DB 121), an availability setting unit 113 (hereinafter also referred to as first availability setting unit 113), a unit 114 determining an extended function (hereinafter also referred to as second function determination unit 114), a database 122 for an extended function (hereinafter also referred to as second DB 122), and a unit 115 setting an extended function available (hereinafter also referred to as second availability setting unit 115).

User determination unit 111 and second function determination unit 114 is configured of control unit 110 and card reader unit 190 cooperating together. First function determination unit 112, first availability setting unit 113 and second availability setting unit 115 is configured in control unit 110. First DB 121 and second DB 122 are configured in storage unit 120.

First DB 121 has first information previously stored therein. The first information allows functions that a plurality of users are authorized to use, respectively, to be determined.

Figure 4:
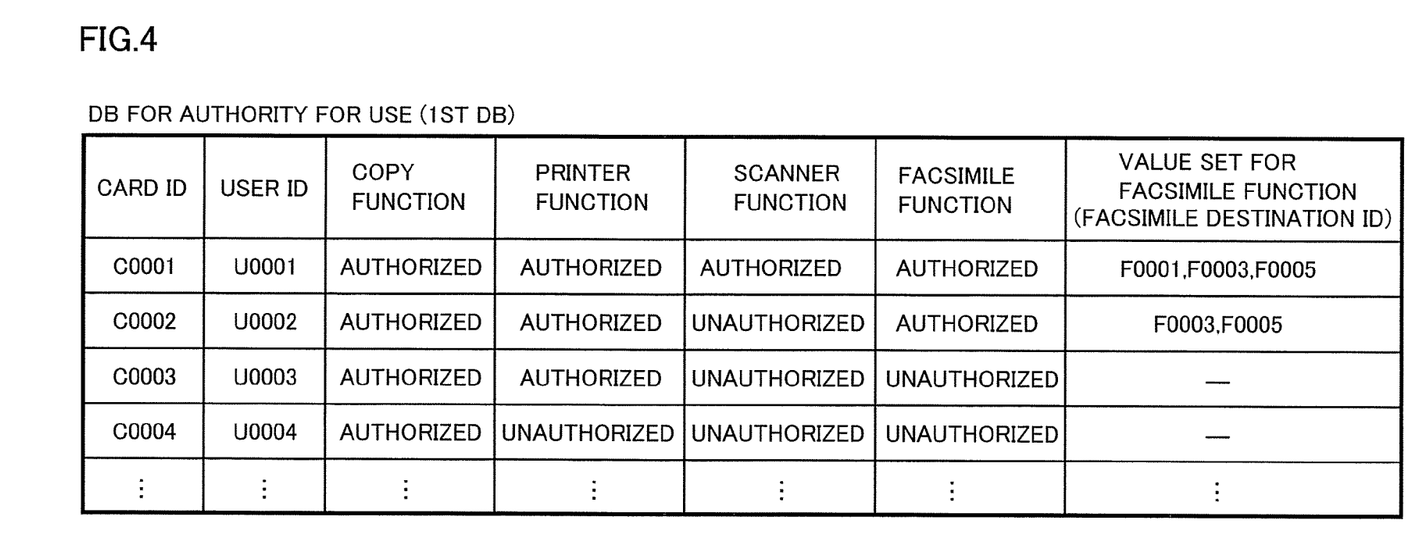
FIG. 4 is a diagram for illustrating a DB configured in a storage unit of the MFP of the embodiment for authority for use.

FIG. 4 is a diagram for illustrating first DB 121 configured in MFP 100 at storage unit 120 in accordance with the present embodiment. With reference to FIG. 4 first DB 121 has stored therein in association with each other: information indicating a card ID of IC card 191, information indicating a user ID of a user possessing that IC card 191; information indicating whether the user is authorized to use a copy function, information indicating whether the user is authorized to use a printer function; information indicating whether the user is authorized to use a scanner function; information indicating whether the user is authorized to use a facsimile function, and an ID of a destination of a facsimile corresponding to a value set for that facsimile function.

For example, first DB 121 has stored therein that a user having a user ID "U0001" and possessing IC card 191 having a card ID "C0001" is authorized to use the copy function, the printer function, the scanner function, and the facsimile function transmitting a facsimile to destinations having facsimile destination IDs "F0001", "F0003" and "F0005".

Similarly, first DB 121 has stored therein that a user having a user ID "U0002" and possessing IC card 191 having a card ID "C0002" is authorized to use the copy function and the printer function, unauthorized to use the scanner function, and authorized to use the facsimile function transmitting a facsimile to destinations having facsimile destination IDs "F0003" and "F0005".

Furthermore, first DB 121 has stored therein that users having user IDs "U0003" and "U0004" and possessing IC cards 191 having card IDs "C0003" and "C0004", respectively, are authorized to use the copy function, authorized and unauthorized, respectively, to use the printer function, unauthorized to use the scanner function, and unauthorized to use the facsimile function.

Note that storage unit 120 of MFP 100 has a telephone number of a destination of a facsimile stored therein in association with a facsimile destination ID. In other words, the telephone number of the destination of the facsimile can be determined from the facsimile destination ID.

Referring again to FIG. 3, user determination unit 111 receives a user ID input from IC card 191 and determines a user associated with that user ID. IC card 191 has second information previously stored therein. The second information allows a user ID of a user who possesses that IC card 191 to be determined.

Note that while user determination unit 111 is adapted to determine a user from IC card 191, it is not limited thereto, and it may be adapted to receive a user ID input by a user via operation unit 130 and thus determine the user.

Furthermore MFP 100 may be adapted to include a unit reading a fingerprint, an iris, a palm or a vain of a finger tip, a voiceprint, or like biometric information, which may be input to the unit and from such information a user may be determined.

First function determination unit 112 determines from the information stored in first DB 121, as described with reference to FIG. 4, a function that the user determined by user determination unit 111 is authorized to use.

For example, if the user determined by user determination unit 111 is the user having the user ID "0002", then from the information stored in first DB 121 it is determined that the user is authorized to use the copy function, the printer function, the scanner function, and the facsimile function transmitting a facsimile to destinations having the facsimile destination IDs "F0003" and "F0005".

First availability setting unit 113 sets MFP 100 to make available the functions determined by first function determination unit 112. More specifically, setting MFP 100 to make a function available means setting MFP 100 to have a state allowing the function to be performed when an operation using the function is performed by a user.

Second DB 122 has a card ID and an extended function previously stored therein in association with each other. An extended function as referred to herein is a function set available to a user that is extended and thus further set available.

Note that if an extended function completely is discrete from a function set available to a user, the extended function will all be set available. If the extended function includes a function partially overlapping the function set available to the user, the extended function excluding that overlapping function will be set available. Furthermore, if the extended function is all included in the function set available to the user, then the extended function has initially been available, and in effect there will be no function to be extended.

Figure 5:
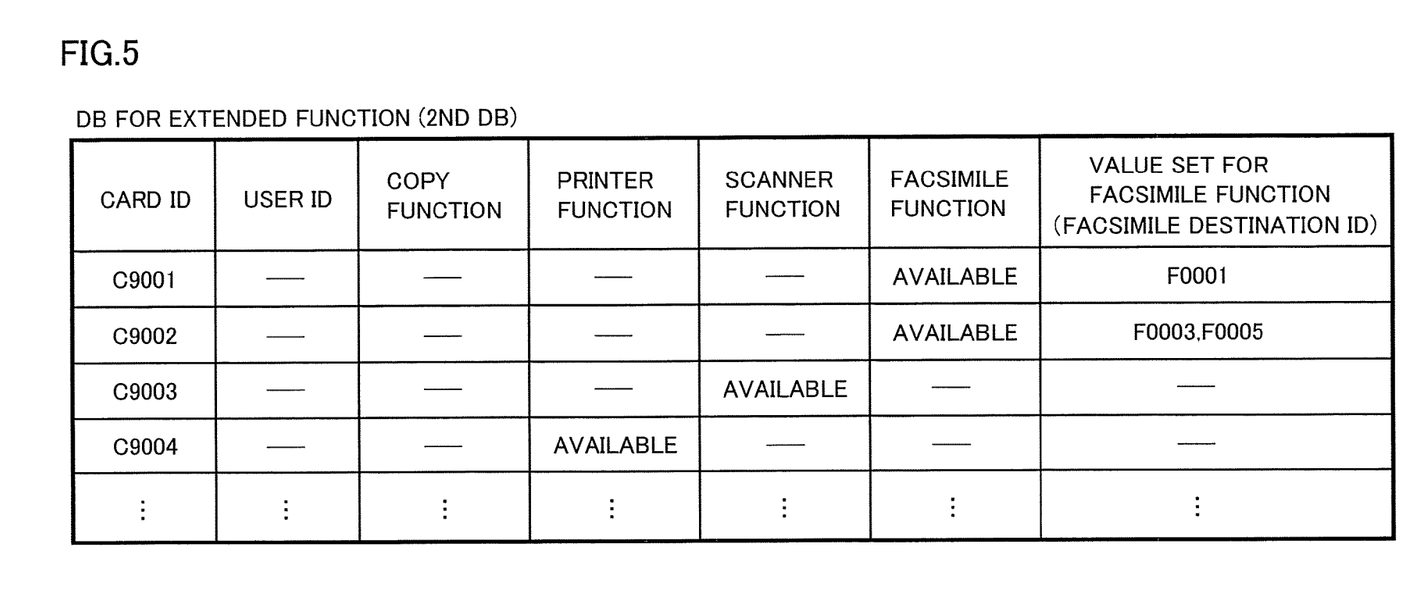
FIG. 5 is a diagram for illustrating a DB configured in a storage unit of the MFP of the embodiment for an extended function.

FIG. 5 is a diagram for illustrating second DB 122 configured in MFP 100 at storage unit 120 in accordance with the present embodiment. With reference to FIG. 5 second DB 122 has stored therein in association with each other information indicating a card ID of function extension IC card 192, information indicating whether function extension IC card 192 having that card ID allows the copy function to be extended and thus made available, information indicating whether function extension IC card 192 having that card ID allows the printer function to be extended and thus made available, information indicating whether function extension IC card 192 having that card ID allows the scanner function to be extended and thus made available, information indicating whether function extension IC card 192 having that card ID allows the facsimile function to be extended and thus made available; and an ID of a destination of a facsimile corresponding to a value set for that facsimile function.

For example, second DB 122 has stored therein that function extension IC card 192 having a card ID "C9001" allows a facsimile function that transmits a facsimile to a destination having the facsimile destination ID "F0001" to be made available.

Similarly, second DB 122 has stored therein that function extension IC card 192 having a card ID "C9002" allows a facsimile function that transmits a facsimile to destinations having the facsimile destination IDs "F0001" and "F0005" to be made available.

Furthermore, second DB 122 has stored therein that function extension IC cards 192 having card IDs "C9003" and "C9004" allow the scanner function and the printer function, respectively, to be made available.

Note that second DB 122 is provided with a memory area for storing information indicating a user ID so that second DB 122 and first DB 121 previously described with reference to FIG. 4 have a format in common. Herein, however, for function extension IC card 192, a user ID is not set. Accordingly in second DB 122 information indicating a user ID is not stored.

Furthermore while IC card 191 has stored therein information indicating a card ID and that indicating a user ID, function extension IC card 192 does not have stored therein information indicating a user ID and only has information indicating a card ID stored therein.

However, a provisional user ID may be set for each function extension IC card 192 and stored in second DB 122 at a memory area storing information indicating a user ID, and function extension IC card 192 may have the provisional user ID stored therein in addition to the card ID. Thus, function extension IC card 192, as well as IC card 191, will have a card ID and a user ID stored therein. This allows an IC card having a common memory area to be used as any of IC card 191 and function extension IC card 192 and hence card reader unit 190 to be simplified in configuration and function.

Referring again to FIG. 3, second function determination unit 114 receives a card ID input from function extension IC card 192 and determines an extended function determined by that card ID. Function extension IC card 192 has third information previously stored therein. The third information allows the card ID of that function extension IC card 192 to be determined Function extension IC card 192 is kept stringently by an administrator of MFP 100 and lent to a user using an extended function determined from the card ID stored in that function extension IC card 192.

Furthermore, second function determination unit 114 reads an extended function that is stored in second DB 122 in association with the received card ID to determine that extended function.

For example, if second function determination unit 114 receives the card ID "C9001" from function extension IC card 192, a function stored in second DB 122 in association with that card ID "C9001", i.e., a facsimile function transmitting a facsimile to a destination having the facsimile destination ID "F0001" is determined as an extended function.

Note that receiving the third information input from function extension IC card 192 having the third information stored therein to determine that extended function is not limited to function extension IC card 192 and second function determination unit 114. A function extension IC card 192A having stored therein as the third information information indicating an extended function may be provided and a second function determination unit 114A may receives the information input from function extension IC card 192A to determine the extended function that is indicated by the information.

Second availability setting unit 115 sets MFP 100 to make available an extended function determined by second function determination unit 114 in addition to a function set available by first availability setting unit 113.

For example, if first availability setting unit 113 sets available the copy function, the printer function, the scanner function and the facsimile function transmitting a facsimile to destinations having the facsimile destination IDs "F0003" and "F0005" and second function determination unit 114 determines as an extended function the facsimile function transmitting a facsimile to a destination having the facsimile destination ID "F0001", then MFP 100 is eventually set so that the printer function, the scanner function, and the facsimile function transmitting a facsimile to the destinations having the facsimile destination IDs "F0001", "F0003" and "F0005" are available.

Thus a user placing IC card 191 over card reader unit 190 of MFP 100 can use a function that the user determined by information stored in IC card 191 is authorized to use, and in addition an extended function determined by information stored in function extension IC card 192 placed over card reader unit 190.

Figure 6:
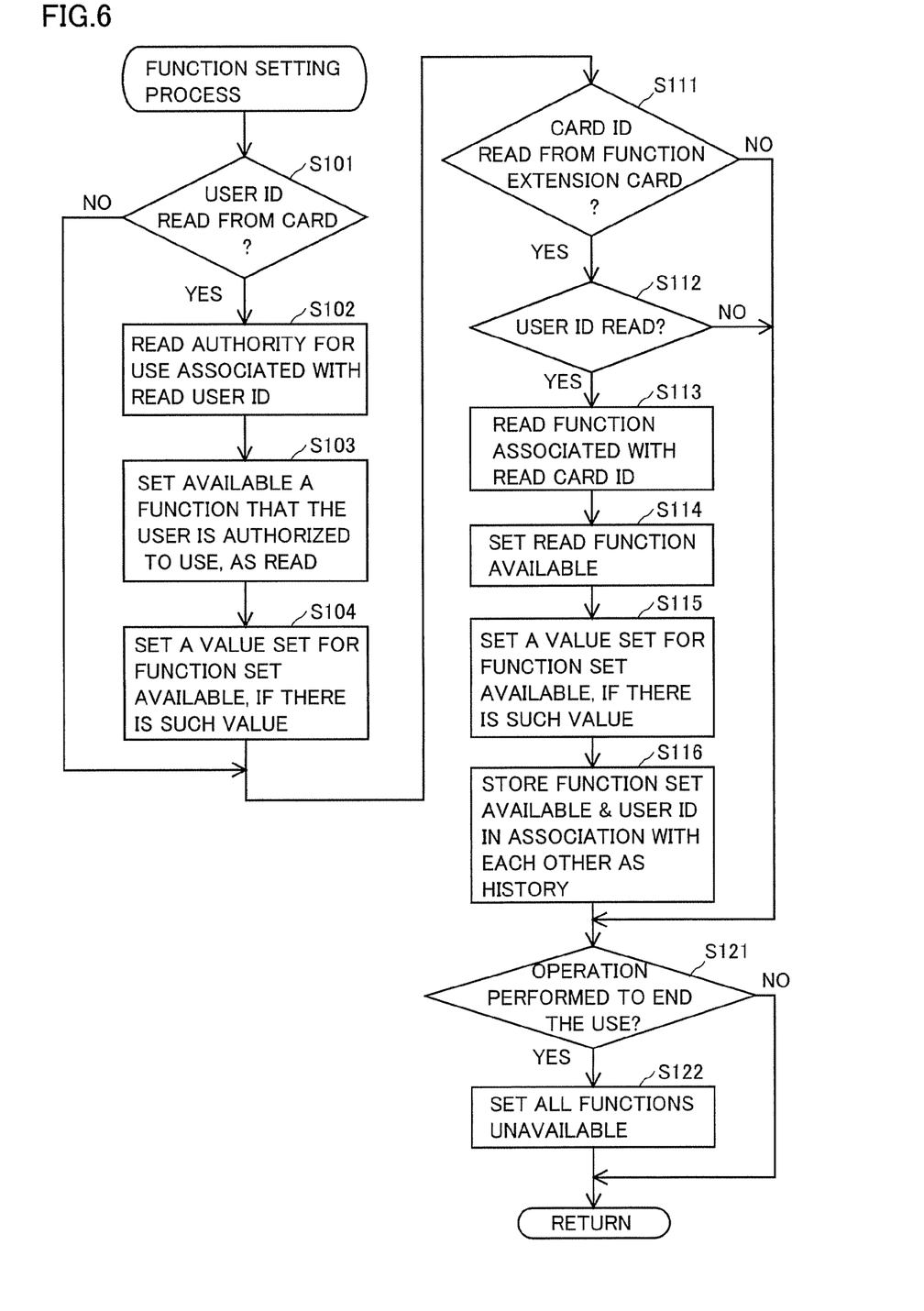
FIG. 6 is a flowchart of a function setting process performed in the MFP of the embodiment.

FIG. 6 is a flowchart of a function setting process performed in MFP 100 of the embodiment. With reference to FIG. 6, the function setting process is performed as a subroutine of a main process performed in MFP 100.

Initially at step S101 control unit 110 determines whether a user places IC card 191 over card reader unit 190 and information indicating a user ID is read from that IC card 191.

By control unit 110 performing step S101 and card reader unit 190 reading a user ID to determine a user, the FIG. 3 user determination unit 111 is configured.

If control unit 110 determines that information indicating a user ID is not read from IC card 191 (NO at S101) then control unit 110 proceeds to step S111.

If control unit 110 determines that information indicating a user ID is read from IC card 191 (YES at S101) then control unit 110 proceeds to step S102 to read from first DB 121 described with reference to FIG. 4 an authority for use that corresponds to the user ID read at step S101.

For example, if the user ID read at step S101 is "U0004", then that the user is authorized to use the copy function and unauthorized to use the printer, scanner and facsimile functions is read from first DB 121.

By control unit 110 performing step S102, the FIG. 3 first function determination unit 112 is configured.

Subsequently at step S103 control unit 110 sets MFP 100 to make available a function that the user is authorized to use, as read at step S102.

For example if that the user is authorized to use the copy function and unauthorized to use the printer, scanner and facsimile functions is read at step S102, then MFP 100 is set to make available the function that the user is authorized to use, i.e., the copy function.

By control unit 110 performing step S103, the FIG. 3 first availability setting unit 113 is configured.

Subsequently at step S104 if there is a value that is set stored in the FIG. 4 first DB 121 in association with a function set available in step S103 control unit 110 sets that value. For example, if the facsimile destination IDs "F0003" and "F0005" are stored in first DB 121 in association with a facsimile function set available, then the facsimile destination IDs "F0003" and "F0005" are set as values set for the facsimile function. Subsequently control unit 110 proceeds to step S111.

At step S111 control unit 110 determines whether a user places function extension IC card 192 over card reader unit 190 and information indicating a card ID is read from that function extension IC card 192.

If control unit 110 determines that information indicating a card ID is not read from function extension IC card 192 (NO at S111) then control unit 110 proceeds to step S121.

If control unit 110 determines that information indicating a card ID is read from function extension IC card 192 (YES at S111) then control unit 110 proceeds to step S112 to determine whether a user ID has been read at step S101. If not (NO at step S112) control unit 110 proceeds to step S121.

In other words, if a user ID has not been read, a function that a user is authorized to use, that is to be extended is not set available to the user, and accordingly steps S113-S116 of extending a function is not performed.

If control unit 110 determines that a user ID has been read, (YES at S112) then control unit 110 proceeds to step S113 to read from second DB 122 described with reference to FIG. 5 an extended function associated with the card ID read in step S111.

For example, if the card ID read at step S111 is "C9001" the facsimile function is read as an extended function.

By control unit 110 performing steps S111 and S113 and card reader unit 190 reading a card ID to determine an extended function associated with the card ID, the FIG. 3 second function determination unit 114 is configured.

Subsequently at step S114 control unit 110 sets MFP 100 to make an extended function that is read at step S113 available in addition to a function set available at step S103.

For example if step S103 is performed to set the copy function available and step S113 is performed to read the facsimile function as an extended function then eventually the copy and facsimile functions are set available.

By control unit 110 performing step S114, the FIG. 3 second availability setting unit 115 is configured.

Subsequently at step S115 if there is a value that is set stored in the FIG. 5 second DB 122 in association with a function set available in step S114 control unit 110 sets that value.

For example, if step S114 is performed to set the facsimile function available and second DB 122 has the facsimile destination ID "F0001" stored therein in association with the facsimile function as a value that is set, then the facsimile destination ID "F0001" is set as a value set for the facsimile function.

Subsequently at step S116 control unit 110 stores the function set at step S114 as available and the user ID read at step S101, in storage unit 120 as a history in association with each other. Subsequently control unit 110 proceeds to step S121.

At step S121 control unit 110 determines whether the user operating operation unit 130 performs an operation to end using MFP 100. If so (YES at S121) then control unit 110 proceeds to step S122 to set unavailable any functions set at steps S103 and S114 as available.

Otherwise (NO at S121) and after step S122 control unit 110 returns to the main process from which the function setting process is called.

Figure 7:
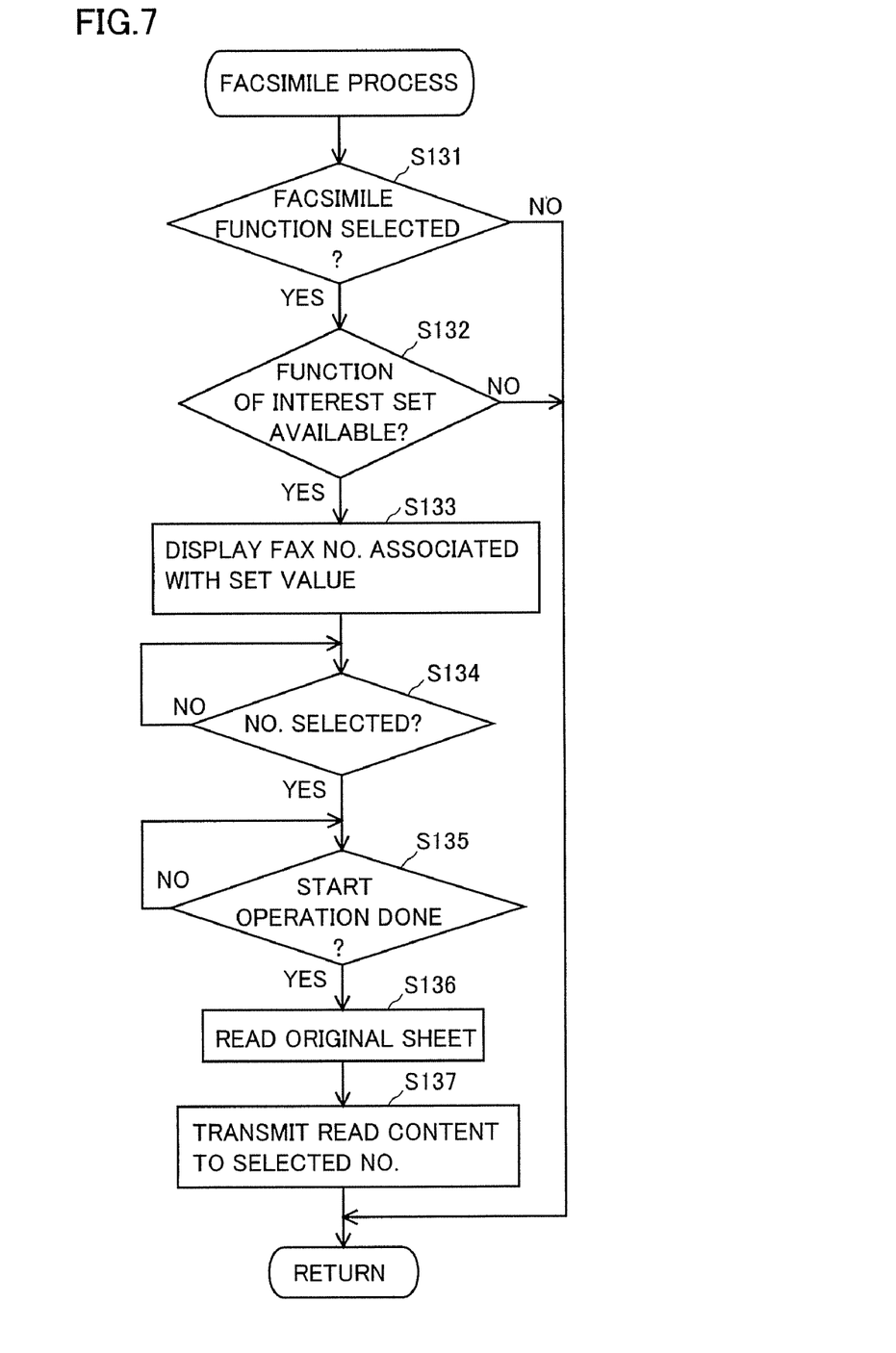
FIG. 7 is a flowchart of a facsimile process performed in the MFP of the embodiment.

FIG. 7 is a flowchart of a facsimile process performed in MFP 100 of the present embodiment. With reference to FIG. 7, the facsimile process is a subroutine of the main process performed in MFP 100.

Initially at step S131 control unit 110 determines whether a user operating operation unit 130 selects the facsimile function. If so (YES at S131) control unit 110 proceeds to step S132 to determine whether the FIG. 5 step S103 or S114 is performed to set the facsimile function available.

If so (YES at S132) then control unit 110 proceeds to step S133 to control display unit 140 to display a telephone number stored in storage unit 120 in association with a value, or a facsimile destination ID, set in step S104 or S115.

Subsequently at step S134 control unit 110 determines whether the user operating operation unit 130 operates the touch panel to select a telephone number displayed at step S133. If not (NO at S134) then control unit 110 repeats step S134.

If control unit 110 determines that a displayed telephone number is selected (YES at S134) then control unit 110 proceeds to step S135 to determine whether the user operating operation unit 130 operates a start button thereof to perform a start operation. If not (NO at S135) then control unit 110 repeats step S135.

Note that after step S132 is performed and before step S135 is performed to determine that the start operation has been performed a setting of a facsimile function unrestricted for use may be changed. For example, a setting that switches a facsimile's transmission quality between a normal mode and a fine mode may be changed.

If control unit 110 determines that the start operation has been performed (YES at S135) the control unit 110 proceeds to step S136 to control scanner unit 170 to read from an original sheet what should be transmitted by the facsimile function.

Subsequently at step S137 control unit 110 controls communication unit 160 to transmit what is read at step S136 to a destination indicated by a telephone number selected at step S134.

If control unit 110 determines that the facsimile function is not selected (NO at S131) and that the facsimile function is not set available (NO at S132), and after step S137 is performed, then control unit 110 returns to the main process from which the facsimile process is called.

Thus in MFP 100 of the first embodiment, as has been described in conjunction with the FIG. 3 first DB 121 and with reference to FIG. 4, information that allows functions that a plurality of users are authorized to use, respectively, to be determined is previously stored in storage unit 120 at first DB 121. As has been described in conjunction with the FIG. 3 user determination unit 111 and the FIG. 6 step S101, information indicating a user ID identifying a user that is input is received to determine that user. As has been described in conjunction with the FIG. 3 first function determination unit 112 and the FIG. 6 step S102, a function that the user as determined is authorized to use is determined from information previously stored in first DB 121. As has been described in conjunction with the FIG. 3 first availability setting unit 113 and the FIG. 6 step S103, MFP 100 is set to make the determined function available.

As has been described in conjunction with the FIG. 3 second function determination unit 114 and second DB 122 and the FIG. 6 steps S111 and S113, a card ID allowing an extended function to be determined that is input is received from function extension IC card 192 having that card ID stored therein to determine the extended function. As has been described in conjunction with the FIG. 3 second availability setting unit 115 and the FIG. 6 step S114, MFP 100 is set to make the determined extended function available in addition to the function set by first availability setting unit 113 in step S103 to be available.

Thus to a user who does not use function extension IC card 192 MFP 100 makes available only a function that the user is authorized to use and to a user who uses function extension IC card 192 MFP 100 makes available an extended function that is determined by function extension IC card 192 in addition to a function that the user is authorized to use. MFP 100 can thus restrict a user other than a particular user in using a particular function, while allowing a user who is restricted in using that particular function to use the function to allow an operation to proceed smoothly.

Furthermore, as has been described in conjunction with the FIG. 3 second DB 122 and with reference to the FIG. 5, a card ID and an extended function are associated with each other and thus previously stored in storage unit 120 at second DB 122. As has been described in conjunction with the FIG. 3 second function determination unit 114 and second DB 122 and steps S111 and S113, as information allowing an extended function to be determined a card ID input from function extension IC card 192 is received and the extended function previously stored in second DB 122 in association with the received card ID is read and thus determined.

As such, simply having function extension IC card 192 store a card ID therein allows MFP 100 to determine an extended function from the card ID and hence readily.

Furthermore, as has been described with reference to FIG. 6 at step S116, a user ID allowing a user, as determined at step S101, to be determined, and an extended function determined at step S113 are associated with each other and thus stored in storage unit 120.

This allows a user for whom a function is extended to be determined after the function has been extended. This in turn allows an investigation to be conducted for an improper function extension done by a user who is not permitted to use function extension IC card 192.

Furthermore, as has been described with reference to FIG. 6 at step S121, operation unit 130 is operated to perform an operation to input that the use of MFP 100 ends and such input is received. As has been described with reference to FIG. 6 at step S122, if operation unit 130 is operated to perform an operation to input that the use of MFP 100 ends and such input is received, MFP 100 is set to make unavailable the functions set in step S103 and S114 as available.

Thus once the user has performed an operation to end using MFP 100 MFP 100 sets unavailable a function that has been set available to that user. This can restrict a user other than a particular user in using a particular function.

Furthermore, as has been described in conjunction with the FIG. 3 first availability setting unit 113 and second availability setting unit 115 and the FIG. 6 steps S104 and S115, if there is a value set for a function set available, the value is set.

Thus MFP 100 allows a user to use an extended function within the range of a set value. This can restrict using the extended function more than necessary.

Furthermore, as has been described in conjunction with the FIG. 3 user determination unit 111 and with reference to the FIG. 6 step S101, a user ID that allows a user to be determined that is input from IC card 191 having that user ID stored therein, is received. This can facilitate determining the user.

Furthermore, as has been described with reference to the FIG. 6 steps S112 and S114, if a user ID has been read and a user is determined, MFP 100 is set to make a determined extended function available. Thus when a user is re-determined an extended function is made available. This can prevent the extended function from being used if the user cannot be re-determined. This can reinforce a restriction on using the extended function.

Furthermore, as has been described in conjunction with the FIG. 3 second function determination unit 114, function extension IC card 192 is kept by an administrator of MFP 100 and lent to a user using an extended function determined from a card ID stored in function extension IC card 192.

Thus function extension IC card 192 can be lent to a user permitted by the administrator of MFP 100. This can prevent an improper user from obtaining function extension IC card 192.

Second Embodiment

Figure 8:
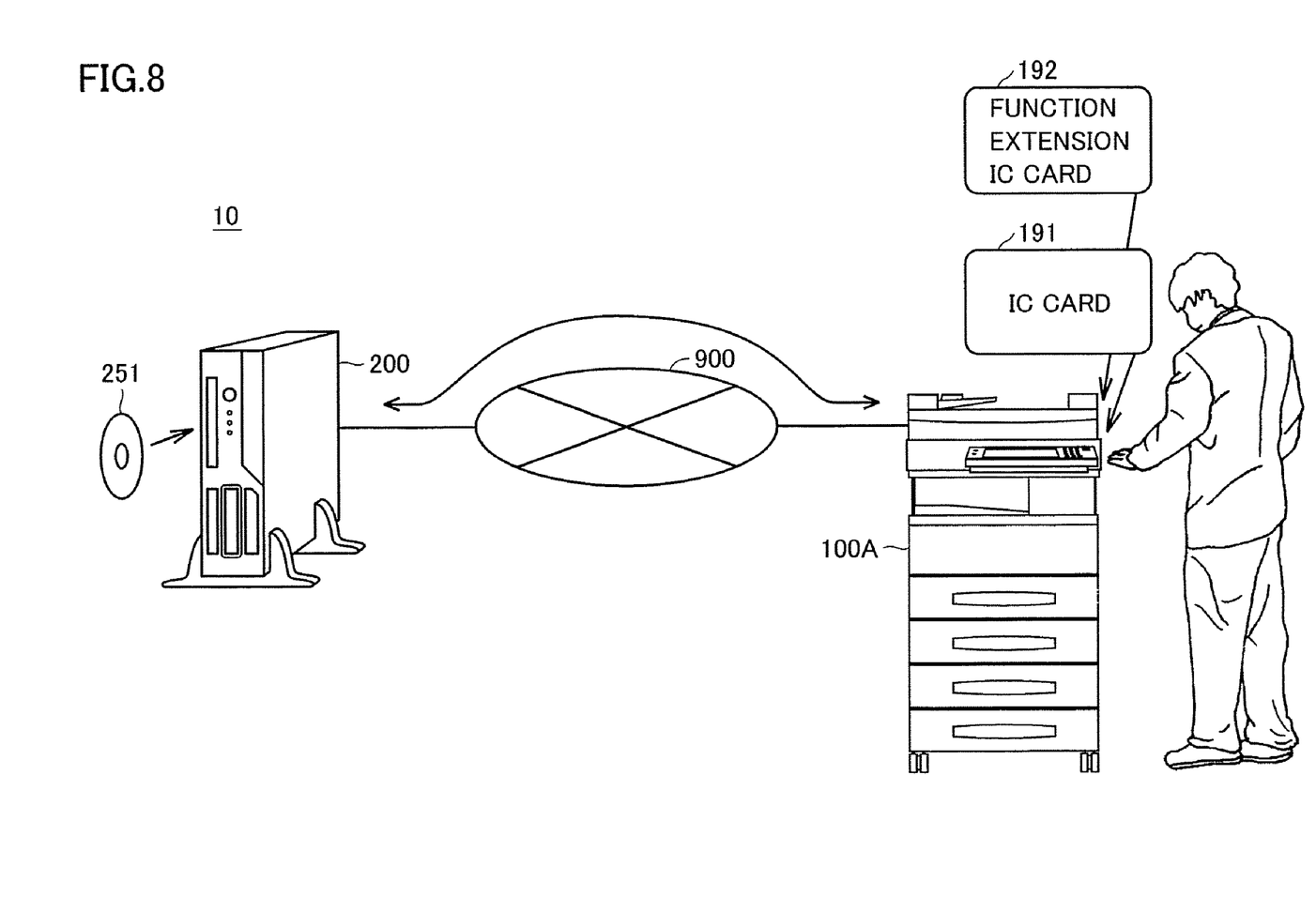
FIG. 8 schematically shows a configuration of an image formation authentication system in a second embodiment of the present invention.

FIG. 8 schematically shows a configuration of an image formation authentication system 10 in a second embodiment of the present invention. With reference to FIG. 8, image formation authentication system 10 includes one or more MFPs 100A and an authentication server 200. MFPs 100A and authentication server 200 are connected by communication line 900. MFP 100A is similar in configuration to MFP 100 described with reference to FIG. 2.

Figure 9:
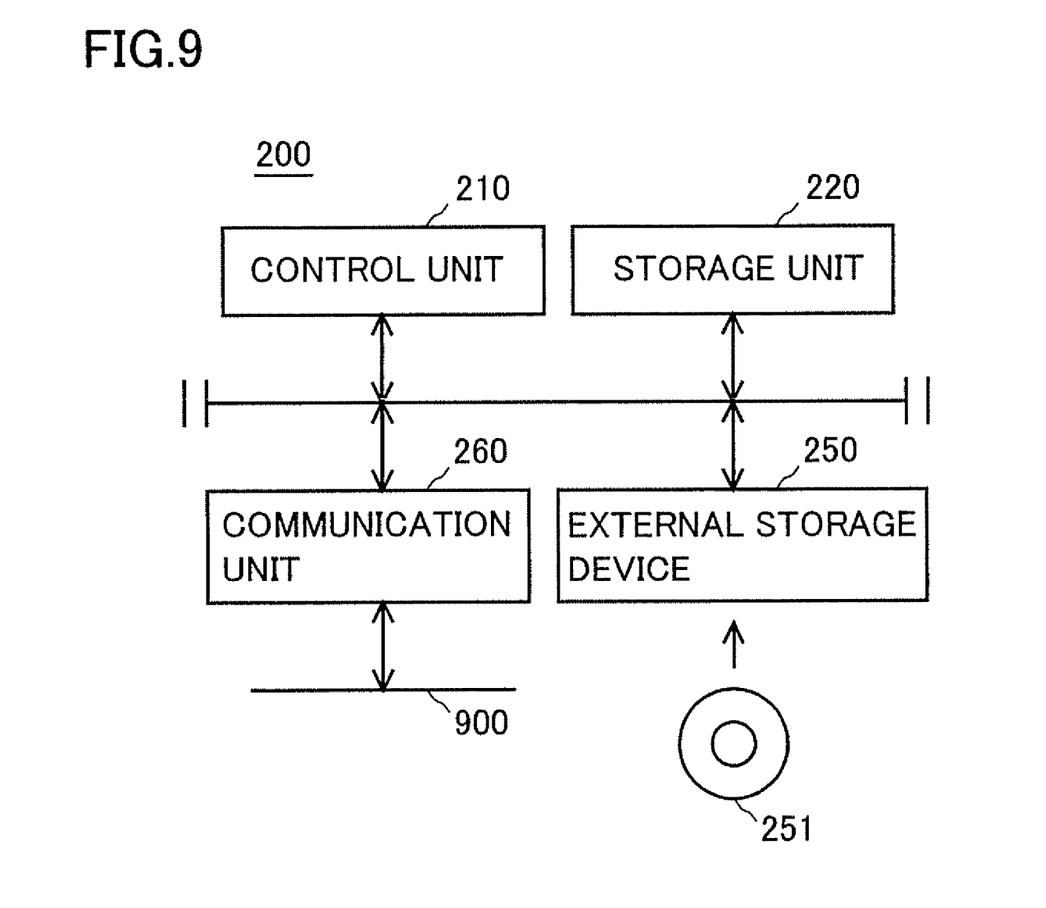
FIG. 9 is a block diagram of a configuration of an authentication server in the second embodiment.

FIG. 9 is a block diagram of a configuration of authentication server 200 in the second embodiment. With reference to FIG. 9, authentication server 200 includes a control unit 210 for generally controlling authentication server 200, a storage unit 220 for storing predetermined information therein, an external storage device 250 assisting storage unit 220 for storing predetermined information therein, and a communication unit 260 for communicating with an external apparatus on communication line 900.

Storage unit 220 includes a random access memory (RAM) used as a working memory required to execute a program in control unit 210, and a read only memory (ROM) for storing the program executed by control unit 210. Furthermore the RAM receives and stores therein a program and data read from external storage device 250 or via communication unit 260 to perform a predetermined process. Furthermore, a hard disk drive or a memory card may be used as an auxiliary memory device for assisting the memory area of the RAM.

External storage device 250 is configured of a hard disk drive, a flexible disk drive, a magneto-optical (MO) disk drive, a compact disc (CD) drive, a digital versatile disk (DVD) drive, a memory card reader/writer, or a similar storage device.

External storage device 250 receives predetermined data or a predetermined program from control unit 210 and stores it in a storage medium 251 magnetically, optically or electrically, and reads the data or the program from storage medium 251 and passes it to control unit 210.

Storage medium 251 includes: a hard disk, a flexible disk and other similar magnetic disks; a compact disk read only memory (CD-ROM), a compact disk recordable (CD-R), a compact disk rewritable (CD-RW), a digital versatile disk read only memory (DVD-ROM), a digital versatile disk recordable (DVD-R), a digital versatile disk recordable disc (DVD-RW), a digital versatile disk random access memory (DVD-RAM), a DVD+R, a digital versatile disk rewritable (DVD+RW) and other similar optical disks, a magneto-optical (MO) disk; a memory card; a universal serial bus (USB) memory; and the like.

Communication unit 260 communicates data with an external apparatus, e.g., MFP 100 on communication line 900 under a predetermined protocol. Communication unit 260 externally transmits data received from control unit 210 and passes externally received data to control unit 210.

Control unit 210 is configured of a micro processing unit (MPU) and its auxiliary circuitry. Control unit 210 controls storage unit 220, external storage device 250 and communication unit 260 to perform a predetermined process in accordance with a program and data stored in storage unit 220 to process data received from external storage device 250 or communication unit 260 and cause storage unit 220 or storage medium 251 of external storage device 250 to store the processed data therein and cause communication unit 260 to output the processed data.

While in the present embodiment authentication server 200 does not include an operation unit and a display unit, it may include an operation unit and a display unit.

Referring back to FIG. 8, authentication server 200 includes storage unit 220 including a database for an authority for use, or a first DB, and a database for an extended function, or a second DB, that are similar to first DB 121 and second DB 122, respectively, described in the first embodiment with reference to FIG. 3, and MFP 100A includes storage unit 120 excluding first DB 121 and second DB 122.

MFP 100A includes user determination unit 111, unit 112 determining a function that a user is authorized to use (hereinafter also referred to as first function determination unit 112), availability setting unit 113 (hereinafter also referred to as first availability setting unit 113), unit 114 determining an extended function (hereinafter also referred to second function determination unit 114), and unit 115 setting an extended function available (hereinafter also referred to as second availability setting unit 115). The user determination unit 111, first availability setting unit 113 and second availability setting unit 115 of MFP 100A are similar to user determination unit 111, first availability setting unit 113 and second availability setting unit 115 of MFP 100 of the first embodiment described with reference to FIG. 3. Accordingly they will not be described repeatedly.

First function determination unit 112 of MFP 100A determines from information stored in the first DB of authentication server 200 a function that a user determined by user determination unit 111 is authorized to use.

Second function determination unit 114, of MFP 100A receives a card ID input from function extension IC card 192 and reads an extended function stored in authentication server 200 at the second DB in association with the received card ID to determine the extended function.

Thus, in image formation authentication system 10 of the second embodiment, the first and the second DBs can be included in authentication server 200, and in one or more MFPs 100A, to a user who does not use function extension IC card 192, only a function that the user is authorized to use can be made available, and to a user who uses function extension IC card 192, a function that the user is authorized to use and in addition thereto an extended function that is determined by that function extension IC card 192 can also be made available. Image formation authentication system 10 can thus restrict a user other than a particular user in using a particular function in one or more MFP 100A, while allowing a user who is restricted in using that particular function to use the function to allow an operation to proceed smoothly.

A variation of the above described embodiments will now be described

In the above described embodiments first DB 121 described with reference to FIG. 4 is adapted to have a function that a user is authorized to use and a function that the user unauthorized to use previously stored therein in association with a user ID of that user.

Alternatively, the first DB may have previously stored therein other information that can store first information allowing functions that a plurality of users are authorized to use, respectively, to be determined. For example, the first DB may have a function that a user is authorized to use previously stored therein in association with a user ID of that user. The first DB may have a function that a user is unauthorized to use previously stored therein as the first information in association with a user ID of that user.

Furthermore the first DB may have a user ID of a user who is authorized to use a function and a user ID of a user who is unauthorized to use that function previously stored therein in association with information indicating the function. The first DB may have a user ID of a user who is authorized to use a function previously stored therein in association with information indicating that function. The first DB may have a user ID of a user who is unauthorized to use a function previously stored therein as the first information in association with information indicating that function.

While the above embodiments with reference to FIG. 7 have been described for a facsimile process, they can similarly be discussed for a copy process, a printer process and a scanner process.

More specifically in each of the copy, printer and scanner processes whether the copy/printer/scanner process is selected is determined, as done at step S131. As done at step S132, whether the function is set available is determined. As done at steps S133 and S134, if there is a value set for the function that is selectable display unit 140 displays the value and operation unit 130 receives a selection. For example, for the scanner function, if the IP addresses of a plurality of PCs of destinations are set as values that are set, then display unit 140 displays the plurality of IP addresses and a selection is received. As done at step S135, whether operation unit 130 is operated to start the function is determined. As done at steps S136 and S137, the function is effected.

In the above described embodiments IC card 191 is first placed over a card reader and thereafter function extension IC card 192 is done so, as currently, normally used non contact IC cards can only be used, one at a time to allow data to be read. If two non contact IC cards overlapping each other nonetheless allow data stored therein to be read, such IC card 191 and function extension IC card 192 overlapping each other may be placed over the card reader.

In the above described embodiments, as has been described with reference to FIG. 7 at step S131, whether operation unit 130 is operated to select a function of MFP 100 is determined regardless of whether that function is set available. Alternatively, operation unit 130 may be adapted to prevent selecting the function if the function is not set available. For example, the LCD of display unit 140 may not display a button for selecting the function so that the touch panel of operation unit 130 cannot be operated to select the function.

In the above described embodiments a copy function, a printer function, a scanner function and a facsimile function are extendible. Alternatively, a management function effecting a management mode that allows the contents of first DB 121 and second DB 122, a setting that only an administrator of MFP 100 can change, and the like to be changed, a network management function effecting a network setting mode allowing a setting associated with a network to be changed; and other similar functions may be extendible.

This allows the administrator of MFP 100 to allow the management function and network management function that otherwise would not be performed without inputting a password associated with the administrator to be performed by a person as a proxy without letting the person know the password associated with the administrator. Once a password has been given away, the function of interest would be available again and again, function extension IC card 192 can be returned to make the function unavailable.

While in the above described embodiments the present invention has been described as the apparatus of MFP 100, the present invention can also be perceived as a function extension method or a function extension program that performs in MFP 100 the process described with reference to FIG. 6 or 7.

Furthermore the present invention can also be perceived as a computer readable storage medium having the function extension program stored therein. This storage medium may be magnetic tape, a flexible disk, a hard disk or an other similar magnetic disk, a CD-ROM, a CD-R, a CD-RW, a DVD-ROM, a DVD-R, a DVD-RW, a DVD-RAM, a DVD+R, a DVD+RW or an other similar optical disk, a magneto-optical (MO) disk, a memory card, a USB memory, or an other similar medium carrying a program therein in a fixed manner, or a medium carrying a program fluxionally, such as downloading the program on a communication network from a server such as an application service provider (ASP).

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image formation apparatus having at least one of a copy function, a printer function, a scanner function and a facsimile function, comprising:
   a first function storage unit in which first information is previously stored, said first information indicating a plurality of users associated with a function that each of the plurality of users is authorized to use;
   a user determination unit determining a user by receiving second information identifying a user;
   a first function determination unit determining a normal function that the user determined by said user determination unit is authorized to use, said normal function being a function associated with the user in said first information stored in said first function storage unit;
   a first availability setting unit setting the image formation apparatus to make available said normal function determined by said first function determination unit to the user determined by said user determination unit;
   a second function determination unit determining an extended function by receiving third information input from a first storage medium having said third information stored therein after the user is determined by said user determination unit; and
   a second availability setting unit setting the image formation apparatus to make available said extended function determined by said second function determination unit in addition to said normal function set available by said first availability setting unit, to the user determined by said user determination unit.

2. The image formation apparatus according to claim 1, further comprising a function extension history storage unit storing said second information allowing said user determined by said user determination unit to be determined, and said extended function determined by said second function determination unit, therein in association with each other.

3. The image formation apparatus according to claim 1, further comprising:
   an input unit receiving an input corresponding to an operation ending using the image formation apparatus; and
   an unavailability setting unit setting the image formation apparatus, if said input unit receives said input corresponding to said operation ending using the image formation apparatus, to make unavailable said normal function and said extended function set available by said first availability setting unit and said second availability setting unit, respectively.

4. The image formation apparatus according to claim 1, further comprising a value setting unit setting a value set for said normal function and said extended function set available by said first availability setting unit and said second availability setting unit, respectively.

5. The image formation apparatus according to claim 1, wherein said user determination unit receives said second information input from a second storage medium having said second information stored therein.

6. The image formation apparatus according to claim 1, wherein said second availability setting unit sets the image formation apparatus to make said extended function determined available if said user determination unit determines said user.

7. An image formation apparatus having at least one of a copy function, a printer function, a scanner function and a facsimile function, comprising:
   a first function storage unit having first information previously stored therein, said first information allowing functions that a plurality of users are authorized to use, respectively, to be determined,
   a user determination unit receiving second information input to determine a user, said second information allowing that user to be determined;
   a first function determination unit determining from said first information stored in said first function storage unit a normal function that said user determined by said user determination unit is authorized to use;
   a first availability setting unit setting the image formation apparatus to make available said normal function determined by said first function determination unit;
   a second function determination unit receiving third information input from a first storage medium having said third information stored therein, to determine an extended function, said third information allowing said extended function to be determined; and
   a second availability setting unit setting the image formation apparatus to make said extended function determined by said second function determination unit available in addition to said normal function set available by said first availability setting unit;
   said third information being storage medium identification information for identifying said first storage medium having said third information stored therein, further comprising a second function storage unit having said storage medium identification information and said extended function previously stored therein in association with each other, wherein said second function determination unit receives as said third information said storage medium identification information input from said first storage medium and reads said extended function stored in said second function storage unit in association with said storage medium identification information received, to determine said extended function.

8. A method of extending a function available in an image formation apparatus having at least one of a copy function, a printer function, a scanner function and a facsimile function and having a storage unit having first information previously stored therein, said first information indicating a plurality of users associated with a function that each of the plurality of users is authorized to use, comprising:
   determining a user by receiving second information identifying a user;

determining a normal function that the determined user is authorized to use, the normal function being a function associated with the user in the first information stored in the storage unit;

setting the image formation apparatus to make available said determined normal function to the user determined by said determination unit;

determining an extended function by receiving third information input from a storage medium having said third information stored therein after the user is determined; and setting the image formation apparatus to make said determined extended function available to the determined user, in addition to said normal function set available.

9. A nontransitory computer readable storage medium having stored therein a function extension program executed in an image formation apparatus having at least one of a copy function, a printer function, a scanner function and a facsimile function and having a storage unit having first information previously stored therein, said first information indicating a plurality of users associated with a function that each of the plurality of users is authorized to use, said function extension program causing said image formation apparatus to perform a method comprising:

determining a user by receiving second information identifying a user;

determining a normal function that the determined user is authorized to use, the normal function being a function associated with the user in the first information stored in the storage unit;

setting the image formation apparatus to make available said determined normal function to the user determined by said determination unit;

determining an extended function by receiving third information input from a storage medium having said third information stored therein after the user is determined; and setting the image formation apparatus to make said determined extended function available to the determined user, in addition to said normal function set available.

* * * * *